Figure 3:
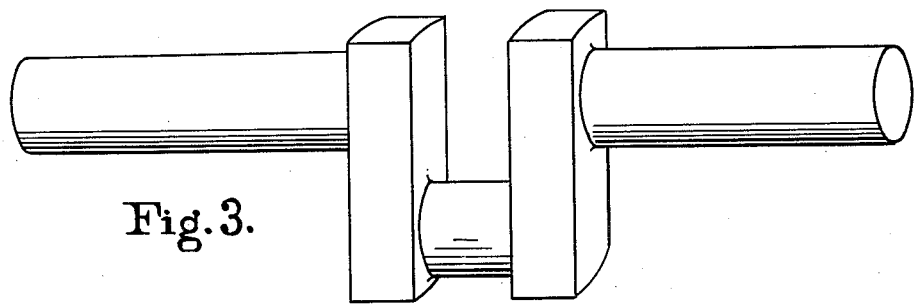

W. I. BROCK.
PROCESS OF MAKING CRANK SHAFTS.
APPLICATION FILED NOV. 7, 1906.

954,923.

Patented Apr. 12, 1910.

WITNESSES:

INVENTOR

UNITED STATES PATENT OFFICE.

WALTER I. BROCK, OF ERIE, PENNSYLVANIA.

PROCESS OF MAKING CRANK-SHAFTS.

954,923.  Specification of Letters Patent.  Patented Apr. 12, 1910.

Application filed November 7, 1906. Serial No. 342,385.

*To all whom it may concern:*

Be it known that I, WALTER I. BROCK, a citizen of the United States, residing at Erie, in the county of Erie and State of Pennsylvania, have invented a new and useful Process for Making Crank-Shafts, which invention is described and set forth in and by the following specification and the accompanying drawing.

This invention relates to a process for making a metal forging for crank shafts by the welding together of thin pieces of metal, of such outline that when assembled together they form a shape similar to the forging to be produced.

I describe the process and illustrate its application to a forging for an engine crank shaft by means of the drawing in which—

Figure 2:
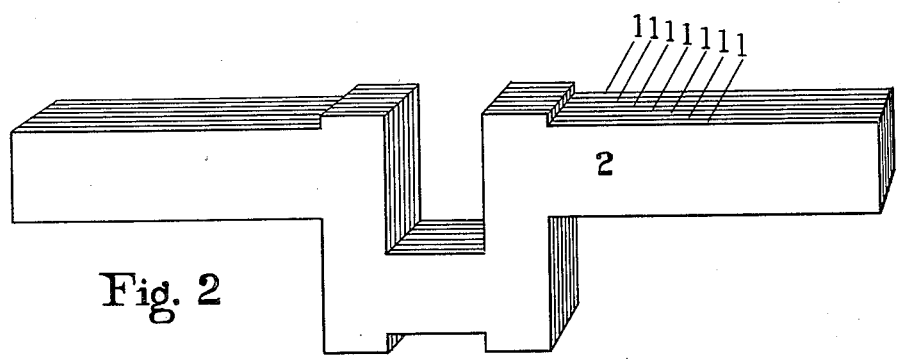
Figure 1:
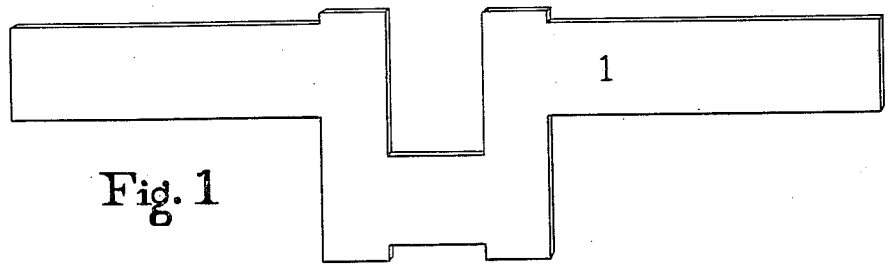

Figure 1 is a view of a single piece of thin metal, in outline of a shape similar to a longitudinal section of the crank shaft Fig. 3 on a center line cutting both the center of the shaft and crank pin. Fig. 2 shows a number of these thin pieces assembled ready for heating, welding and forming to the desired shape. Fig. 3 shows the completed shaft forging.

Similar characters refer to similar parts throughout the several views.

The piece 1, Fig. 1 is shaped from sheet metal, of similar outline to the finished shaft forging, as described; in this instance a number of similar pieces 1 are assembled together, as shown by 2, Fig. 2, a thin layer of pulverized borax or other flux being placed between each layer to facilitate the welding together of the several pieces into a solid mass.

The assembled pieces may be clamped together to facilitate handling or be bound together by bands; I prefer however to dispense with such bands or clamps excepting their use be absolutely necessary.

The assembled pieces or form 2 after preparation as described, is subjected to a temperature necessary to bring the entire form to a welding heat, preferably in a welding furnace with a clean flame; upon reaching a welding heat, the form is welded into a solid mass and given the finished shape shown by Fig. 3 by means of a reciprocating press or hammer provided with suitable dies or molds.

I am aware that forgings are at present made by building up a series of bars, or what is known in the art as fagots, these being welded together to form into forgings.

I am aware that flat strips of metal are welded to irregular shapes, as in the welding of tool steel cutting faces to metal of other quality; also that pieces of what is known as blister steel are welded together to produce shear steel.

What I claim is:

The within described process of making crank shafts which consists in stamping out thin sheets of metal having the outline of the completed article, building said sheets into the form of the article, heating the said sheets to a uniform welding heat, and simultaneously welding and forging said sheets.

In testimony whereof I have hereunto signed my name to this specification in the presence of two subscribing witnesses, at Erie, Pa., the 3rd day of November, 1906.

WALTER I. BROCK.

Witnesses:
W. J. YOUNG,
A. K. BERLAND.